United States Patent
Bier (10) Patent No.: US 11,821,765 B2
(45) Date of Patent: Nov. 21, 2023

(54) MAGNETICALLY INDUCTIVE FLOW MEASURING PROBE, MEASURING ARRANGEMENT AND METHOD FOR DETERMINING A FLOW RATE AND/OR AN INSTALLATION ANGLE

(71) Applicant: Endress+Hauser Flowtec AG, Reinach (CH)

(72) Inventor: Thomas Bier, Riehen (CH)

(73) Assignee: Endress + Hauser Flowtec AG, Reinach (CH)

(*) Notice: Subject to any disclaimer, the term of this patent is extended or adjusted under 35 U.S.C. 154(b) by 95 days.

(21) Appl. No.: 17/415,053

(22) PCT Filed: Nov. 13, 2019

(86) PCT No.: PCT/EP2019/081210
§ 371 (c)(1),
(2) Date: Jun. 17, 2021

(87) PCT Pub. No.: WO2020/126239
PCT Pub. Date: Jun. 25, 2020

(65) Prior Publication Data
US 2022/0065670 A1    Mar. 3, 2022

(30) Foreign Application Priority Data
Dec. 18, 2018 (DE) .................. 10 2018 132 600.9

(51) Int. Cl.
*G01F 1/58* (2006.01)
*G01F 23/24* (2006.01)

(52) U.S. Cl.
CPC .............. *G01F 1/584* (2013.01); *G01F 1/586* (2013.01); *G01F 1/588* (2013.01); *G01F 23/242* (2013.01)

(58) Field of Classification Search
CPC ........ G01F 1/584; G01F 1/586; G01F 23/242; G01F 1/588; G01B 7/30
See application file for complete search history.

(56) References Cited

U.S. PATENT DOCUMENTS

| 3,119,960 A | 1/1964 | Kenyon |
| 3,161,047 A | 12/1964 | Griswold |

(Continued)

FOREIGN PATENT DOCUMENTS

| CN | 1210971 A | 3/1999 |
| CN | 205785366 U | 12/2016 |

(Continued)

OTHER PUBLICATIONS

English translation of DE 3707138 listed on the IDS filed Jun. 17, 2021; Lammers et al., "Electromagnetic sensor, in particular a flow sensor", Published Aug. 4, 1988 (Year: 1988).*

*Primary Examiner* — Peter J Macchiarolo
(74) *Attorney, Agent, or Firm* — Mark A. Logan; Endress+Hauser (USA) Holding, Inc.

(57) ABSTRACT

Disclosed is a magnetically inductive flow measuring probe for determining flow rate and/or flow velocity of a medium, which includes a front part with a front end having a center, a housing, a magnetic field producing means arranged in the housing for producing a magnetic field passing through the front end, and a measuring- and evaluation unit, and characterized in that there are arranged on the front end forming galvanic contact with the medium three measuring electrodes, which form three measuring electrode pairs, and in that the measuring- and evaluation unit is adapted to register induced measured voltages between at least two measuring electrode pairs, especially three measuring electrode pairs, and to ascertain flow rate and/or flow velocity of the medium as a function of the registered voltages.

15 Claims, 3 Drawing Sheets

(56) References Cited

U.S. PATENT DOCUMENTS

| | | | |
|---|---|---|---|
| 3,308,659 | A | 3/1967 | Herndon |
| 3,881,350 | A | 5/1975 | Nosley |
| 3,885,433 | A | 5/1975 | Marsh |
| 4,308,753 | A | 1/1982 | Olson |
| 5,390,548 | A | 2/1995 | Kasper et al. |
| 2003/0130808 | A1* | 7/2003 | Kapitulskiy ............... G01F 1/52 |
| | | | 702/45 |
| 2014/0047927 | A1 | 2/2014 | Marsh |
| 2018/0216978 | A1* | 8/2018 | Dames .................... G01F 15/14 |
| 2018/0245956 | A1* | 8/2018 | Momose ................. G01F 1/588 |

FOREIGN PATENT DOCUMENTS

| | | |
|---|---|---|
| DE | 3037913 A1 | 4/1982 |
| DE | 8332021 U1 | 3/1984 |
| DE | 3707138 A1 | 8/1988 |
| EP | 0534003 A1 | 3/1993 |
| EP | 0892251 A1 | 1/1999 |
| FR | 1528050 A1 | 6/1968 |

* cited by examiner

MAGNETICALLY INDUCTIVE FLOW MEASURING PROBE, MEASURING ARRANGEMENT AND METHOD FOR DETERMINING A FLOW RATE AND/OR AN INSTALLATION ANGLE

CROSS-REFERENCE TO RELATED APPLICATIONS

The present application is related to and claims the priority benefit of German Patent Application No. 10 2018 132 600.9, filed on Dec. 18, 2018, and International Patent Application No. PCT/EP2019/081210, filed on Nov. 13, 2019, the entire contents of which are incorporated herein by reference.

TECHNICAL FIELD

Magnetically inductive flow measuring devices are applied for determining flow velocity and/or volume flow rate of a medium in a measuring tube. A magnetically inductive flow measuring device includes a magnetic field producing means, which produces a magnetic field perpendicularly to the transverse axis of the measuring tube. For such purpose, usually one or more coils are used. In order to implement a predominantly homogeneous magnetic field, supplementally, pole shoes are so formed and applied that a symmetry axis of the magnetic field lines extends essentially perpendicularly to the transverse axis. A measuring electrode pair applied at the outer surface of the measuring tube senses an inductively produced electrical measured voltage, which arises, when a conductive medium flows in the presence of applied magnetic field in the direction of the longitudinal axis. Since the sensed measured voltage depends according to Faraday's law of induction on the velocity of the flowing medium, flow velocity and, with incorporation of a known tube cross section, volume flow rate of the medium can be ascertained from the measured voltage.

BACKGROUND

In contrast with magnetically inductive flow measuring devices, wherein a coil arrangement for producing a magnetic field passing through a measuring tube is affixed at the outer surface of the measuring tube and at least two measuring electrodes are arranged at the inner surface, magnetically inductive flow measuring probes are introduced with their usually circularly cylindrical housing into a lateral opening of the measuring tube and secured fluid-tightly. The mentioned coil arrangement at the outer surface of the measuring tube is absent, since the magnetic field exists only in the region of the front end of the flow measuring probe protruding into the fluid, as formed by an electrical current in this region flowing through its coil arrangement. The flow measuring probe includes usually two stylus-shaped measuring electrodes. There are, however, also flow measuring probes known from EP0534003A1, which have a stylus-shaped measuring electrode arranged in the center of the front end and an annular electrode surrounding the stylus-shaped measuring electrode.

EP0892251A1 discloses a magnetically inductive flow measuring probe, whose front end protruding into the fluid assumes the shape of a spherical cap and in which first and second galvanic electrodes are arranged on a meridian of the spherical cap symmetrically with respect to a peak of the meridian. The flow measuring probe is immersed practically perpendicularly to the flow direction of the fluid to be measured and oriented by rotation such that a line connecting the two electrodes extends perpendicularly to the flow direction. A departure from the ideal installed orientation leads to a decrease in the accuracy of the measured flow.

Known from U.S. Pat. No. 3,881,350A is a magnetically inductive flow measuring probe, which has besides two measuring electrodes arranged on a first diameter two other measuring electrodes arranged on a second diameter, wherein the two diameters are perpendicular to one another. Since a measurement circuit is adapted for this to register voltages lying between the measuring electrode pairs, two ideal installation orientations in the pipeline result for the flow measuring probe.

Disadvantageous in these proposals of the prior art is that, in the case of installing the magnetically inductive flow measuring probe in a measuring point, a clearly defined installation requirement needs to be met. The user must install the flow measuring probe such that the diameter intersecting the two measuring electrodes extends practically perpendicularly to the flow direction of the fluid to be measured. If this is not taken into consideration in the installation, considerable measurement errors result in the determining of the flow rate and/or flow velocity.

SUMMARY

An object of the invention is to provide a magnetically inductive flow measuring probe, a measuring arrangement and a method for determining a flow velocity, all of which contribute to simplifying the installation of the flow measuring probe into the pipeline.

The object is achieved according to the invention by the magnetically inductive flow measuring probe as defined in claim 1, by the method for determining a flow rate and/or an installation angle as defined in claim 10 and the measuring arrangement as defined in claim 15.

A magnetically inductive flow measuring probe of the invention includes a front part with a front end having a center, a housing, a magnetic field producing means arranged in the housing for producing a magnetic field passing through the front end and a measuring- and evaluation unit, and is characterized in that there are arranged on the front end, and forming galvanic contacts with the medium, three measuring electrodes, which form pairs, and in that the measuring- and/or evaluation unit is adapted to register, in each case, a voltage induced between at least two measuring electrode pairs, especially on three measuring electrode pairs, and to ascertain flow rate and/or flow velocity of the medium as a function of the registered voltages.

A great advantage of the flow measuring probe of the invention is that with the three measuring electrodes forming galvanic contacts with the medium at least two measured voltages can be sensed in the flowing medium. These measured voltages are not only proportional to the flow velocity of the medium but depend on the installation orientation of the flow probe. With only one measuring electrode pair, especially with a single measured voltage, it is impossible to obtain extra information on the installation orientation. By having at least one additional measured voltage, the installation orientation can be ascertained compared with the flow direction of the medium, or compared with the longitudinal direction of the pipeline. By means of the measuring- and/or evaluation unit, an installed angle $\alpha$, which is a measure for the difference from the ideal installation orientation, can be ascertained. The installed angle $\alpha$ is defined by a line intersecting a measuring electrode pair and a flow direction of the medium flowing through the pipeline. The installed angle α is set by rotation of the flow measuring probe around the center of the front end. If the installed angle α is known, it can be utilized for correction of the sensed measured voltage. For such purpose, three measuring electrodes and the tapping of two measured voltages by means of the measuring- and/or evaluation unit suffice. The determining of the installation angle α is done after the installation, or at setup of the flow measuring probe, once, continuously or at defined points in time.

The user needs, in the case of the mounting and affixing of the flow measuring probe in the pipeline besides the proper introduction of the flow measuring probe into the pipeline and the sufficient sealing, no longer to worry supplementally about the orientation of the flow measuring probe relative to flow direction.

Taking a third measured voltage into consideration opens other options. For one, the installed angle α can be ascertained by means of the third and first and/or the third and second measured voltage. Thus, by a statistical evaluation, for example, creation of an average value, etc., the variations or the error of the ascertained installation angle α can be reduced. Furthermore, the additional measured voltage serves as control value for installation constellations, in which no voltage is on a measuring electrode pair, in spite of flowing medium. That occurs, for example, when a line intersecting the measuring electrode pair extends in parallel with the flow direction. By taking into consideration all measured voltages, one can distinguish between an installation related error and a defect related failure of a measuring electrode pair. For such purpose, the measuring- and/or evaluation unit must be adapted to tap a measured voltage at each of the measuring electrode pairs formed by the three measuring electrodes. The determining of the installation angle α is done after the installing, or upon setup of the flow measuring probe, once, continuously or at defined points in time. Alternatively, the measuring electrodes can be connected with a multiplexer unit, or an analog or digital selection circuit, which is adapted cyclically to tap the voltages to be measured.

In an embodiment, the measuring electrodes are arranged rotation symmetrically about a center of rotation, wherein the center of the front end forms the center of rotation.

A rotationally symmetric arrangement of the measuring electrodes facilitates evaluation of the measured voltage, since, in the case of an essentially homogeneous magnetic field distribution at the front end, an individual taking into consideration of the arrangement geometry can be omitted in the determining of the installation angle α or the flow.

In an embodiment, the housing is cylindrical, especially circularly cylindrical, with a rotational axis extending through the center of the front end, wherein the rotational axis extends perpendicularly to the front end.

In an embodiment, the magnetic field producing means includes a coil arrangement and a coil core, wherein the magnetic field producing means includes at least one field guideback, wherein the coil core ends at or in the proximity of the front end, wherein the coil core is embodied cylindrically, especially circularly cylindrically, wherein the coil arrangement surrounds the coil core.

Since the measured voltage depends according to Faraday's law of induction on the magnetic field direction, it is advantageous that a symmetry axis of the magnetic field extends in and out of the housing perpendicularly to the front end. The measured voltage depends especially on the magnetic field strength, such that it is especially advantageous that the magnetic field strength be constant over the entire front end, especially between the individual measuring electrode pairs. In this way, a calibration or a magnetic field related correction of the individual ascertained measured voltages can be omitted.

In an embodiment, the field guideback is embodied hollow cylindrically, wherein the field guideback at least partially surrounds the coil core and the coil arrangement.

The field guideback is in that case embodied hollow cylindrically and closed at one end, so that it assumes the shape of a cup. The coil core is arranged in the center of the hollow cylindrical wall. The coil core is embodied cylindrically or prismatically. In such case, the coil core is surrounded by a single field guideback.

In an embodiment, a field guideback is arranged, in each case, between the measuring electrode pairs, wherein the field guidebacks have, in each case, a longitudinal axis, wherein the longitudinal axes extend, in each case, between a measuring electrode pair perpendicularly from the front end.

In an advantageous embodiment, the flow measuring probe includes a plurality of field guidebacks. The field guidebacks are so embodied and arranged that the symmetry axis of the magnetic field extends between the measuring electrodes perpendicularly in and out of the front end. Advantageously, the field guidebacks are stylus-shaped and arranged, in each case, between a measuring electrode pair.

In an additional embodiment, the field guidebacks are embodied as circular ring segments.

In an embodiment, the measuring- and evaluation unit is embodied based on the greatest measured voltage of the measured voltages between the measuring electrodes to ascertain a flow, e.g. a volume flow rate, and/or a flow velocity, and to assign to a measuring electrode, which is not used for determining flow rate and/or flow velocity, the function of a reference electrode or of a fill level monitoring electrode or of an electrode for determining conductivity of the medium.

After determining the installation angle α, one measured voltage, or one measuring electrode pair, suffices for monitoring flow rate and/or flow velocity. Thus, one of the three measuring electrodes is available for monitoring further process related parameters. This measuring electrode is, in this connection, referred to as a functional measuring electrode. Ideally, the measuring- and/or evaluation unit is adapted to ascertain the flow rate and/or flow velocity based on the measuring electrode pair with the greatest measured voltage. In this way, one obtains a better resolution and a lower measurement error, or lower measurement variations. The functional measuring electrode is assigned a new function via the measuring- and/or evaluation unit.

A possible function is the determining of conductivity of the medium. For determining conductivity of the medium, a potential difference is applied between the functional measuring electrode and, for example, the housing, the pipeline or a grounding ring and the electrical current ascertained. Alternatively, a signal, especially a voltage signal, can be applied and from the attenuation of the signal an impedance of the medium ascertained. Therefrom, with suitable model, information regarding conductivity of the medium can be won.

Another function is the monitoring of fill level. Fill level monitoring systems for flow measuring devices are already known for magnetically inductive flow measuring devices. In such case, a so-called fill level monitoring electrode is in the case of horizontal installation of the measuring tube arranged with reference to the cross section of the measuring tube optimally at the uppermost point of the measuring tube. By determining the conductivity of the medium between the fill level monitoring electrode and the reference electrode or a metal process connection, the filling of the tube is monitored. In such case, the medium has versus air always a higher conductivity. If the conductivity sinks below a specified limit value, then a partial filling is detected. The limit value is among others dependent on the specific conductivity of the medium, on the nominal diameter of the measuring tube, on the dimensions and position of the fill level monitoring electrode as well as on the properties of the measuring tube lining. For monitoring fill level by means of the functional measuring electrode, the conductivity of the medium between the functional measuring electrode and a reference potential is ascertained.

Furthermore, the function can be that of a reference electrode. Usually, the housing of the flow measuring probe is metal and is, consequently, connected with a reference potential. In the present case, using the functional measuring electrode as a reference electrode means the housing does not need to be conductive.

The assigning of the function is implemented with a circuit unit, which is installed in the measuring- and/or evaluation unit or in the housing of the flow measuring device.

In an embodiment, there is arranged in the center of the front end a fourth measuring electrode, which forms with the three rotationally symmetrically arranged measuring electrodes fourth, fifth and sixth measuring electrode pairs.

By arranging the measuring electrode in the center, the coil core advantageously has a passageway in the form of a bore, through which the measuring electrode and the connections can be led.

In an embodiment, the fourth measuring electrode is adapted to undertake the function of a reference electrode or the measuring- and evaluation unit is adapted to ascertain each of the voltages lying between the fourth, fifth and/or sixth measuring electrode pairs.

Usually, a metal housing is used. This is connected to a reference potential and serves, thus, as reference electrode. By arranging an electrode adapted as reference electrode, a conductive housing can be omitted. The housing can thus be manufactured of a cost effective, synthetic material, e.g. a plastic.

If the fourth measuring electrode is adapted as reference electrode, the functional measuring electrode performs the function of fill level monitoring electrode.

By tapping the measured voltages between the fourth, fifth and/or sixth measuring electrode pairs, additional ideal installation orientations result. An ideal installation orientation is achieved when a line intersecting any measuring electrode pair extends perpendicularly to the flow direction. With a fourth measuring electrode, the number of ideal installation orientations doubles from 6 to 12. The rotational angle between the individual installation orientations amounts then to 30°, such that the probability of keeping the installed angle $\alpha$ as small as possible rises.

A method of the invention for determining a flow rate, e.g. a volume flow rate, and/or a flow velocity of a medium in a pipeline by means of a magnetically inductive flow measuring probe as defined in one of the versions above and/or an installation angle $\alpha$ of the magnetically inductive flow measuring probe, wherein the installed angle $\alpha$ is defined by a line intersecting a measuring electrode pair and a flow direction of the medium flowing through the pipeline, is characterized by method steps as follows:

A) measuring first and second measured voltages, wherein the first measured voltage lies between a first measuring electrode pair and the second measured voltage lies between a second measuring electrode pair;

V1) determining the installation angle $\alpha$ as a function of the first and second measured voltages; and W1) determining flow rate and/or flow velocity as a function of the measured voltage lying across a measuring electrode pair and the ascertained installation angle $\alpha$.

Especially advantageously, the installed angle $\alpha$ is ascertained at setup of the flow measuring probe and then henceforth taken into consideration for determining flow rate and/or flow velocity. For determining the installation angle $\alpha$, at least one pair of measured voltages is required. By vector calculation, the measured voltages can be described as a function of installation geometry of the measuring electrodes and installation orientation.

The voltage measured between a measuring electrode pair depends on the installed angle $\alpha$ as follows:

$$U_1 = k_1 \cdot U_i \cdot \cos(\alpha),$$

wherein $U_1$ is the measured voltage, $U_i$ is the measured voltage in the case of ideal installation orientation and $k_1$ is a first correction factor. If another measuring electrode is so arranged that the three measuring electrodes are located at the corners of an equilateral triangle, then, starting from the above measured voltage, the additional measured voltages are:

$$U_2 = k_2 \cdot U_i \cdot \cos(\alpha - 60°)$$

and $$U_3 = k_3 \cdot U_i \cdot \cos(\alpha - 120°).$$

If the correction factors $k_1$, $k_2$ and/or $k_3$ are known, then the equations can be solved for the installed angle $\alpha$. If this is known, the flow rate and/or flow velocity can be ascertained as a function of the installation angle $\alpha$.

If another measuring electrode is placed in the center, three other voltages can be measured. The voltages measured between the measuring electrode pairs can be formulated based on trigonometry. For each measured voltage, an equation can be set up relating each of the measured voltages to the installed angle and the measured voltage expected in the case of an ideal installation orientation. In such case, the arrangement of the measuring electrodes on the front end must be supplementally taken into consideration.

In an embodiment, the method of the invention further includes steps as follows:

B) measuring a third measured voltage, wherein the third measured voltage lies between a third measuring electrode pair; and V2) determining the installation angle $\alpha$ as a function of the first, second and third measured voltages.

Taking a third measured voltage into consideration opens other possibilities. For one, by means of the third and first and/or the third and second measured voltages, in each case, the installed angle $\alpha$ can be ascertained. Thus, by a statistical evaluation, for example, creation of an average value of the registered measured voltages, etc., the variations or the error of the ascertained installation angle $\alpha$ can be reduced. Furthermore, the additional measured voltage serves as control value for installation constellations, in which no voltage is present between a measuring electrode pair. That occurs, for example, when a line intersecting a measuring electrode pair extends in parallel with the flow direction. Thus, installation related and defect related failure of a measuring electrode pair can be distinguished. For such purpose, the measuring- and/or evaluation unit must be adapted to tap a measured voltage on each measuring electrode pair formed by the three measuring electrodes. The determining of the installation angle α happens after the installing, or at setup, of the flow measuring probe once, continuously or at defined points in time.

In an embodiment, the method of the invention further includes the following method step:

Z) outputting the installation angle α and/or the flow rate and/or flow velocity by means of an output unit.

In an embodiment, the method of the invention further includes steps as follows:

K) measuring voltage lying between the measuring electrode pairs;

L) summing the measured voltages;

M) outputting the ascertained sum of the measured voltages; and/or

N) creating an error report, when the sum of the measured voltage deviates from a predefined desired value.

Often, irregularities or defect related differences in the determining of flow rate and/or flow velocity can occur. Then, it is especially helpful, when one can detect, or exclude, a defect using a plausibility check. If the measuring electrodes are arranged rotation symmetrically and the magnetic field is distributed homogeneously over the front end, then the sum of the measured voltages is a desired value. In the ideal case, the desired value for the present measuring electrode arrangement equals zero. It can be determined earlier in a calibration procedure or be fixedly predetermined.

In an embodiment, the method of the invention further includes steps as follows:

W2) determining flow rate and/or flow velocity based on the measuring electrode pair having the greatest measured voltage of the ascertained measured voltages;

Q) providing a measuring electrode, which is not used for determining flow rate and/or flow velocity, but rather for monitoring fill level; and/or R) providing a measuring electrode, which is not used for determining flow rate and/or flow velocity, but rather for determining conductivity of the medium, and/or S) providing a measuring electrode, which is not used for determining flow rate and/or flow velocity, but rather as a reference electrode.

After determining the installation angle α, it suffices to determine the flow rate and/or flow velocity with a single measuring electrode pair. Advantageously, the measuring electrode pair having the greatest measured voltage of the three measured voltages is used for determining flow rate and/or flow velocity. One of the three measuring electrodes, in the following referred to as functional measuring electrode, can thus be assigned a new function. Depending on the application, a circuit unit can be adapted to assign the functional measuring electrode the function of a fill level monitoring electrode.

A measuring point of the invention for determining flow, e.g. a volume flow rate, and/or flow velocity of a medium includes a pipeline, which conveys the medium in a longitudinal direction defined by a pipe axis and an opening in a wall of the pipeline, and is characterized in that a magnetically inductive flow measuring probe as defined in one of the above versions is introduced through the opening into the pipeline, wherein the installed angle α is defined by a line intersecting a first measuring electrode pair and a flow direction of the medium flowing through the pipeline, wherein the measuring- and/or evaluation unit is adapted to perform a method of the invention for determining flow rate and/or flow velocity.

A use according to the invention of a magnetically inductive flow measuring probe as defined in one of the above versions for monitoring the measuring point is characterized in that in the case of a change of the ascertained installation angle α a report is created and output by means of an output unit.

By determining the installation angle α continuously or at defined points in time, the flow measuring probe can be used for monitoring the measuring point.

Changes of the ascertained installation angle are an indication of a loosening of the screwed connection or a change of the flow behavior, which occurs when a deposit or plugging has arisen in the pipeline.

BRIEF DESCRIPTION OF THE DRAWINGS

The invention will now be explained in greater detail based on the appended drawing, the figures of which show as follows.

DETAILED DESCRIPTION

Figure 1:
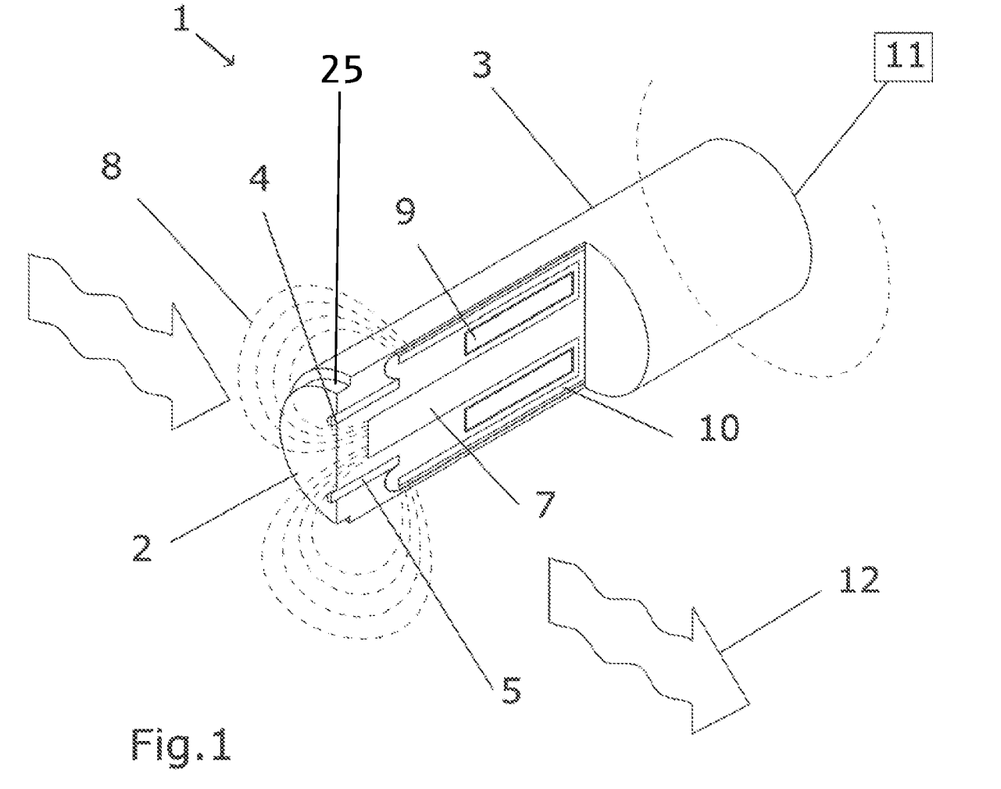
FIG. 1 shows a perspective view of a magnetically inductive flow measuring probe of the state of the art.

Using the perspective and partially sectioned FIG. 1, firstly, the measuring principle underlying the invention will be explained. A flow measuring probe (1) includes a generally circularly cylindrical housing (3) having a predetermined outer diameter. This is matched to the diameter of a bore, which is located in a wall of a pipeline (13) (not shown in FIG. 1 but in FIG. 3) and into which the flow measuring probe (1) is introduced fluid-tightly. Flowing in the pipeline (13) is a fluid to be measured, in which the flow measuring probe (1) extends practically perpendicularly to the flow direction of the fluid, as shown by the wavy arrows (12). A front end (2) of the housing (3) protruding into the fluid is sealed fluid-tightly with a front part of insulating material. By means of a coil arrangement (9) arranged in the housing (3), a magnetic field (8) reaching through the front end and into the fluid can be produced. A coil core (7) composed at least partially of a soft magnetic material and arranged in the housing (3) ends at or in the proximity of the front end. A field guideback (10), which surrounds the coil arrangement (9) and the coil core (7), is adapted to guide the magnetic field (8) passing through the front end back into the housing (3). First and second galvanic measuring electrodes (4, 5) are arranged in the front part and contact the fluid. Induced between the measuring electrodes (4, 5) because of Faradays law of induction can be an electrical voltage, which is tapped by means of a measuring- and/or evaluation unit (11). This voltage is maximum, when the flow measuring probe is so installed in the pipeline (13) that a plane defined by a line intersecting the two measuring electrodes and a longitudinal axis of the flow measuring probe extends perpendicularly to the flow direction (12), or to the longitudinal axis of the pipeline (21).

Figure 2:
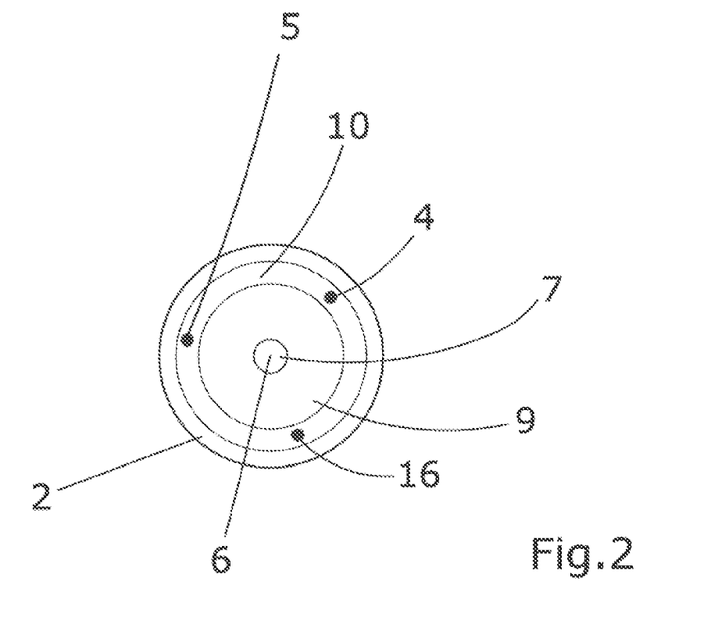
FIG. 2 shows a cross section of a first embodiment of the magnetically inductive flow measuring probe of the present disclosure.

The cross section displayed in FIG. 2 shows the coil core (7) arranged in the center (6), the coil arrangement (9), the field guideback (10), which in this embodiment is embodied hollow cylindrically, and the first, second and third measuring electrodes (4, 5, 16), which are arranged rotationally symmetrically to the center of rotation, here the center (6) of the front end. The arrangement and embodiment of the field guideback (10) is so optimized that the symmetry axis of the magnetic field lines (8) intersects the front end (2) perpendicularly between the measuring electrode pairs and the magnetic field strength is maximum. The installed angle α and the flow rate is output by means of an output unit (20).

Figure 3:
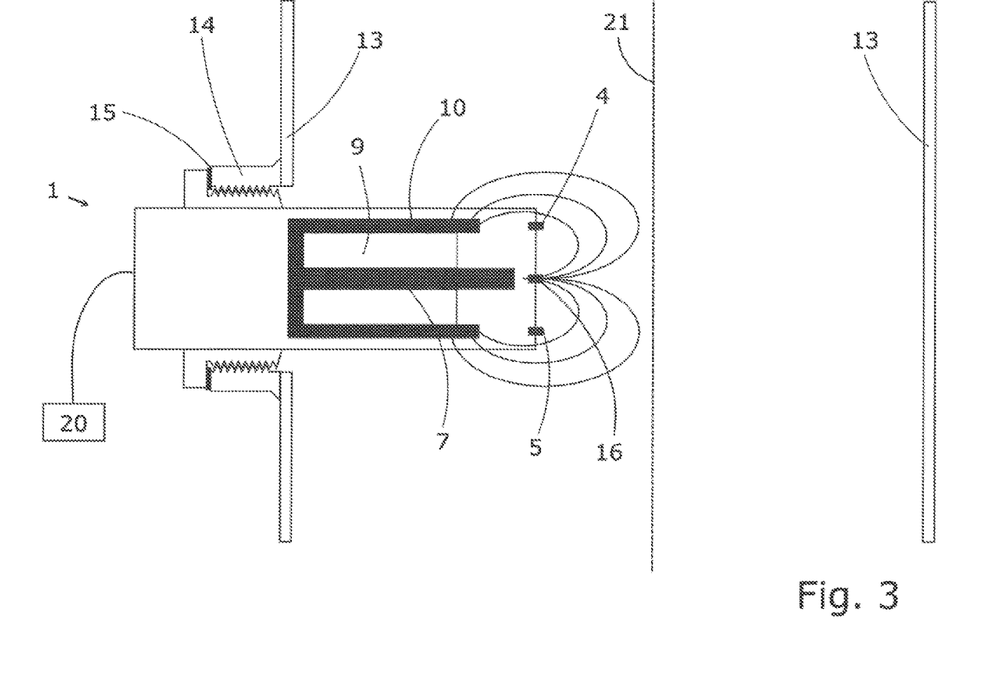
FIG. 3 shows a longitudinal section of a first embodiment of the magnetically inductive flow measuring probe of the present disclosure in a measuring point.

FIG. 3 shows the flow measuring probe (1) in longitudinal section. Flow measuring probe (1) is secured fluid-tightly in the pipeline (13) by means of a screw in connection (14), which is mounted on the wall of the pipeline (13) and e.g. welded with it. This construction of the measuring point is especially helpful, since, firstly, the screw in connection (14) can be placed on the pipeline (13) and secured thereto and then the flow measuring probe (1) introduced, or screwed, into the screw in connection (14) to fix it therein and to seal it by means of a seal (15). The first, second and third measuring electrodes (4, 5, 16) are arranged on the front end (2) symmetrically with respect to a center (6) of the front end.

Figure 4:
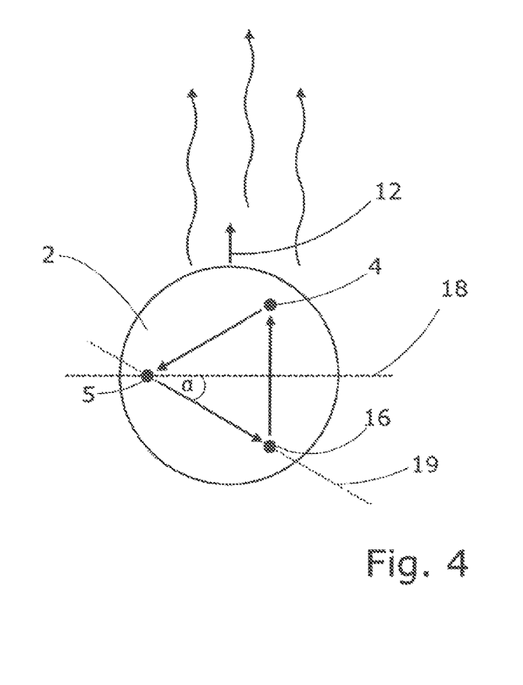
FIG. 4 shows a front view of the magnetically inductive flow measuring probe of the present disclosure in installed position.

In the example of an embodiment in FIG. 4, arrows indicate the measuring electrode pairs, at each of which measured voltage is tapped by means of the measuring- and/or evaluation unit. A dashed line shows an ideally oriented line (18). This defines together with a reference line (19), shown here as a dotted line, the installed angle α. The ideal line (18) extends perpendicularly to the flow direction (12). The reference line (19) can be any measuring electrode pair. In such case, the reference line (19) extends through the second and third measuring electrodes (5, 16).

Figure 5:
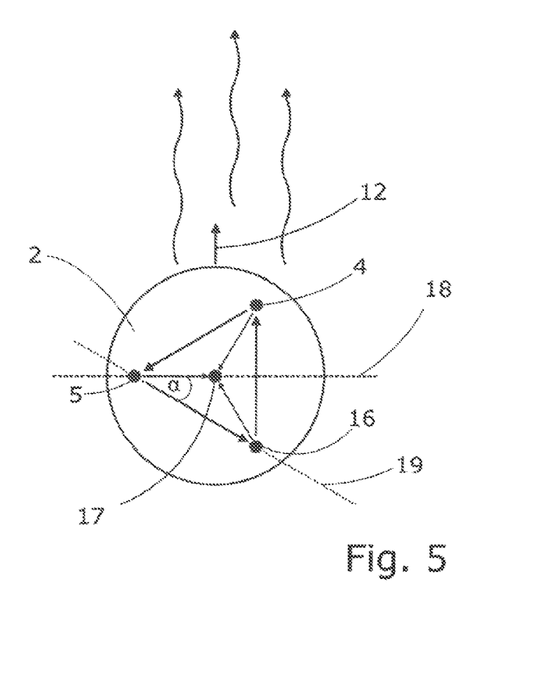
FIG. 5 shows a front view of a second embodiment of the magnetically inductive flow measuring probe of the present disclosure having a fourth measuring electrode in the center of the front end.

In the example of an embodiment of FIG. 5, a fourth measuring electrode (17) is provided in the center (6) of the front end. Arrows display the measuring electrode pairs, for each of which the measured voltage is tapped by means of the measuring- and/or evaluation unit. Supplementing the example of an embodiment shown in FIG. 4, there are three other measuring electrode pairs, on each of which measured voltage is present in the case of flowing medium.

Figure 6:
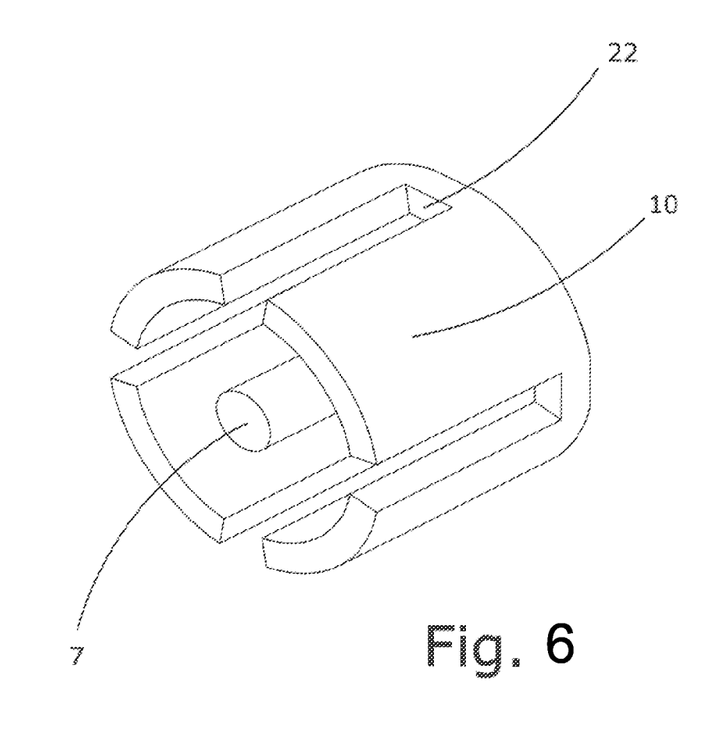
FIG. 6 shows two embodiments of field guidebacks of the magnetic field producing means.

FIG. 6 presents two forms of embodiment of the magnetic field producing means schematically. The basic principle is presented using the first form of embodiment. A platform (22) serves as a connector of the coil core (7) with the field guidebacks (10). The platform is polygonal here, but can also be embodied circularly cylindrically. The field guidebacks are prismatic in FIG. 6. They can, however, have any form, especially forms matched to the measuring electrode arrangement. In the second form of embodiment, the coil core (7) is circularly cylindrical and the field guidebacks (10) are formed as circular ring segments. Furthermore, the base (22) and the field guidebacks (10) are embodied as one piece. The number of field guidebacks (10) depends on the arrangement of the measuring electrodes (4, 5, 16, 17).

LIST OF REFERENCE CHARACTERS 1 flow measuring probe
2 front end
3 housing
4 first measuring electrode
5 second measuring electrode
6 center
7 coil core
8 magnetic field lines
9 coil arrangement
10 field guideback
11 measuring- and/or evaluation unit
12 flow direction
13 pipeline
14 screw in connection
15 seal
16 third measuring electrode
17 fourth measuring electrode
18 ideal line
19 reference line
20 output unit
21 longitudinal axis of the pipeline
22 platform, base
25 front part

The invention claimed is:

1. A magnetically inductive flow measuring probe for determining a flow rate and/or a flow velocity of a medium, comprising:
a housing having a front end having a center;
a magnetic field producing means arranged in the housing for producing a magnetic field passing through the front end;
a measuring and evaluation unit; and
a first, a second, and a third measuring electrode arranged on the front end rotationally symmetrically about the center of the front end and embodied to galvanically contact the medium, wherein the first and second measuring electrodes form a first measuring electrode pair, the second and third measuring electrodes form a second measuring electrode pair, and the first and third measuring electrodes form a third measuring electrode pair,
wherein the measuring and evaluation unit is adapted to:
measure a first voltage induced between the first measuring electrode pair and a second voltage induced between the second measuring electrode pair;
determine an installation angle α as a function of the first and second measured voltages, wherein the installation angle α is defined by a line intersecting the first or the second measuring electrode pair and a flow direction of the medium flowing through the pipeline; and
determine the flow rate and/or the flow velocity of the medium as a function of the first and second measured voltages and the installation angle α.

2. The magnetically inductive flow measuring probe as claimed in claim 1,
wherein the housing is cylindrical having a rotational axis extending through the center of the front end perpendicularly to the front end.

3. The magnetically inductive flow measuring probe as claimed in claim 1,
wherein the magnetic field producing means includes a coil arrangement, a coil core, and at least one field guideback,
wherein the coil core ends at or in proximity of the front end,
wherein the coil core is embodied cylindrically, and
wherein the coil arrangement surrounds the coil core.

4. The magnetically inductive flow measuring probe as claimed in claim 3,
wherein the at least one field guideback is embodied as a hollow cylinder and at least partially surrounds the coil core and the coil arrangement.

5. The magnetically inductive flow measuring probe as claimed in claim 3,
wherein the magnetic field producing means includes three field guidebacks,
wherein each field guideback is arranged, in each case, between the measuring electrode pairs,
wherein the field guidebacks have, in each case, a longitudinal axis extending between a measuring electrode pair perpendicularly from the front end.

6. The magnetically inductive flow measuring probe as claimed in claim 1,
wherein the measuring and evaluation unit is further adapted to determine the greater measured induced voltage between the first measured voltage and the second measured voltage and based on the greater measured voltage to ascertain the flow rate, the volume flow rate, and/or the flow velocity, and to assign to a measuring electrode that is not used for determining flow rate and/or flow velocity a function of a reference electrode, of a fill level monitoring electrode, or of an electrode for determining conductivity of the medium.

7. The magnetically inductive flow measuring probe as claimed in claim 1, further comprising:
a fourth measuring electrode arranged in the center of the front end and forming with the three rotationally symmetrically arranged measuring electrodes a fourth, a fifth, and a sixth measuring electrode pair.

8. The magnetically inductive flow measuring probe as claimed in claim 7,
wherein the fourth measuring electrode is adapted to undertake a function of a reference electrode, or
wherein the measuring and evaluation unit is further adapted to ascertain each of the voltages lying between the fourth, fifth, and sixth measuring electrode pairs.

9. The magnetically inductive flow measuring probe as claimed in claim 1,
wherein the measuring and evaluation unit is further adapted to:
measure a third voltage induced between the third measuring electrode pair; and
determine the installation angle $\alpha$ as a function of the first, second, and third measured voltages.

10. A method for determining a flow rate of a medium in a pipeline, comprising:
providing a magnetically inductive flow measuring probe, including:
a housing having a front end having a center;
a magnetic field producing means arranged in the housing for producing a magnetic field passing through the front end;
a measuring and evaluation unit; and
a first, a second, and a third measuring electrode arranged on the front end rotationally symmetrically about the center of the front end and embodied to galvanically contact the medium, wherein the first and second measuring electrodes form a first measuring electrode pair, the second and third measuring electrodes form a second measuring electrode pair, and the first and third measuring electrodes form a third measuring electrode pair,
wherein the measuring and evaluation unit is adapted to:
measure a first voltage induced between the first measuring electrode pair and a second voltage induced between the second measuring electrode measuring electrode pair;
determine an installation angle $\alpha$ as a function of the first and second measured voltages, wherein the installation angle $\alpha$ is defined by a line intersecting the first or the second measuring electrode pair and a flow direction of the medium flowing through the pipeline; and
determine the flow rate and/or the flow velocity of the medium as a function of the first and second measured voltages and the installation angle $\alpha$;
measuring the first and second measured voltages, wherein the first measured voltage lies between the first measuring electrode pair and the second measured voltage lies between the second measuring electrode pair;
determining the installation angle $\alpha$ as a function of the first and second measured voltages, wherein the installation angle $\alpha$ is defined by the line intersecting the first or second measuring electrode pair and the flow direction of the medium flowing through the pipeline; and
determining the flow rate and/or a flow velocity as a function of the first and second measured voltages and the determined installation angle $\alpha$.

11. The method as claimed in claim 10,
wherein the measuring and evaluation unit is further adapted to measure a third voltage induced between the third measuring electrode pair, the method further comprising:
measuring the third measured voltage, wherein the third measured voltage lies between the third measuring electrode pair; and
determining the installation angle $\alpha$ as a function of the first, second, and third measured voltages.

12. The method as claimed in claim 10, further comprising:
outputting the installation angle $\alpha$ and/or the flow rate and/or flow velocity by means of an output unit.

13. The method as claimed in claim 10, further comprising:
measuring the voltage lying between the first, second, and third measuring electrode pairs;
summing the three measured voltages;
outputting the ascertained sum of the measured voltages; and/or
creating an error report when the sum of the measured voltage deviates from a predefined desired value.

14. The method as claimed in claim 10, further comprising:
determining the flow rate and/or flow velocity of the medium based on the measuring electrode pair having the greatest measured voltage of the ascertained measured voltage and based on the ascertained installation angle $\alpha$;
providing a measuring electrode, which is not used for determining flow rate and/or flow velocity, but rather for monitoring fill level; and/or
providing a measuring electrode, which is not used for determining flow rate and/or flow velocity, but rather for determining conductivity of the medium; and/or
providing a measuring electrode, which is not used for determining flow rate and/or flow velocity, but rather as a reference electrode.

15. A measuring point for determining a flow, a volume flow rate, and/or a flow velocity of a medium, comprising:

a pipeline which conveys the medium in a longitudinal direction defined by a pipe axis;
an opening in a wall of the pipeline; and
a magnetically inductive flow measuring probe, including:
  a housing having a front end having a center;
  a magnetic field producing means arranged in the housing for producing a magnetic field passing through the front end;
  a measuring and evaluation unit; and
  a first, a second, and a third measuring electrode arranged on the front end rotationally symmetrically about the center of the front end and embodied to galvanically contact the medium, wherein the first and second measuring electrodes form a first measuring electrode pair, the second and third measuring electrodes form a second measuring electrode pair, and the first and third measuring electrodes form a third measuring electrode pair,
  wherein the measuring and evaluation unit is adapted to:
    measure a first voltage induced between the first measuring electrode pair and a second voltage induced between the second measuring electrode pair;
    determine an installation angle $\alpha$ as a function of the first and second measured voltages, wherein the installation angle $\alpha$ is defined by a line intersecting the first or the second measuring electrode pair and a flow direction of the medium flowing through the pipeline; and
    determine the flow rate and/or the flow velocity of the medium as a function of the first and second measured voltages and the installation angle $\alpha$,
  wherein the magnetically inductive flow measuring probe is introduced through the opening into the pipeline, and
  wherein the installed angle $\alpha$ is defined by the line intersecting the first or the second measuring electrode pair and the flow direction of the medium flowing through the pipeline.

* * * * *